US012739893B2

(12) United States Patent
Liu et al.

(10) Patent No.: US 12,739,893 B2
(45) Date of Patent: Sep. 15, 2026

(54) WIRELESS COMMUNICATION METHOD FOR PHYSICAL RANDOM ACCESS CHANNEL, APPARATUS, AND COMPUTER-READABLE MEDIUM

(71) Applicant: ZTE Corporation, Shenzhen (CN)

(72) Inventors: Xing Liu, Shenzhen (CN); Junfeng Zhang, Shenzhen (CN); Xianghui Han, Shenzhen (CN); Jian Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 106 days.

(21) Appl. No.: 18/829,766

(22) Filed: Sep. 10, 2024

(65) Prior Publication Data

US 2025/0008569 A1 Jan. 2, 2025

Related U.S. Application Data

(63) Continuation of application No. PCT/CN2023/073007, filed on Jan. 18, 2023.

(51) Int. Cl.
*H04W 74/0833* (2024.01)
*H04W 72/0446* (2023.01)

(52) U.S. Cl.
CPC ... *H04W 74/0833* (2013.01); *H04W 72/0446* (2013.01)

(58) Field of Classification Search
CPC ......... H04W 74/0833; H04W 72/0446; H04W 74/085; H04W 36/0077; H04W 72/23; H04W 74/004; H04W 74/006
See application file for complete search history.

(56) References Cited

U.S. PATENT DOCUMENTS

2021/0029738 A1 1/2021 Zhou et al.
2021/0058971 A1 2/2021 MolavianJazi et al.
2021/0127429 A1 4/2021 Huang et al.
2021/0289558 A1 9/2021 Han et al.
(Continued)

FOREIGN PATENT DOCUMENTS

CN 112888070 A 6/2021
EP 4494421 A1 1/2025
(Continued)

OTHER PUBLICATIONS

Qualcomm; "Summary of Remaining Details on RACH Procedure", 3GPP TSG RAN WG1 Meeting 91 R1-1721623, Nov. 27-Dec. 1, 2017, (45 pages).
(Continued)

*Primary Examiner* — Marisol Figueroa
(74) *Attorney, Agent, or Firm* — Crowell & Moring LLP

(57) ABSTRACT

Wireless communication methods are disclosure. A wireless communication method includes determining a Synchronization Signal Block (SSB) for a RACH process; and determining a RO set according to the determined SSB to transmit a PRACH for at least two times. Another wireless communication method includes receiving a PRACH, for at least two times from user equipment (UE), wherein the PRACH is transmitted on a RO set determined by the UE according to a Synchronization Signal Block (SSB) for a RACH process; and transmitting a responsive message in response to the PRACH.

20 Claims, 9 Drawing Sheets

(56) References Cited

U.S. PATENT DOCUMENTS

2021/0352737 A1* 11/2021 Yang ................. H04W 74/0841
2022/0110167 A1 4/2022 Boroujeni et al.
2024/0407008 A1* 12/2024 Lin ................... H04W 74/0833

FOREIGN PATENT DOCUMENTS

WO WO 2022/064462 A1 3/2022
WO WO-2024073949 A1 * 4/2024 .......... H04W 74/006
WO WO 2024/103527 A1 5/2024

OTHER PUBLICATIONS

Extended European Search Report dated Mar. 24, 2025 and Supplementary European Searcy Report issued in corresponding PCT Application No. PCT/CN2023073007 (3 pages).

Australian Office Action dated Apr. 11, 2025, issued in corresponding Australian patent application No. 2023381837, dated Jan. 18, 2023 (3 pages).

European Office Action issued in European Application No. 23 889 979.3 dated Jan. 23, 2026 (5 pages).

Vivo, "3GPP TSG-RAN WG2 Meeting #102, R2-1807573" PRACH resource selection, May 25, 2018 (4 pages).

Ericsson, "3GPP TSG RAN WGI Meeting #92, R1-1802946", Remaining details of RACH procedure, Mar. 2, 2018 (6 pages).

Moderator (China Telecom), "3GPP TSG RAN WG1 Meeting #111, R1-2212568", FL Summary #3 on PRACH coverage enhancements, Nov. 14-18, 2022 (49 pages).

Australian Office Action dated Jul. 2, 2025, issued in corresponding Australian patent application No. 2023381837, 3 pages.

Notice of acceptance for patent application dated Jul. 17, 2025, 3 pages.

* cited by examiner

WIRELESS COMMUNICATION METHOD FOR PHYSICAL RANDOM ACCESS CHANNEL, APPARATUS, AND COMPUTER-READABLE MEDIUM

CROSS REFERENCE

This application is a continuation of and claims priority to International Patent Application No. PCT/CN2023/073007, filed on Jan. 18, 2023, which is herein incorporated by reference in its entirety.

TECHNICAL FIELD

This disclosure is generally related to PRACH transmission, and more particularly to PRACH transmission for random access or handover processes.

BACKGROUND

Wireless communication technologies are pivotal components of the increasingly interconnecting global communication networks. Wireless communications rely on accurately allocated time and frequency resources for transmitting and receiving wireless signals. PRACH (Physical Random Access Channel) is used by user equipment (UE) to request an uplink allocation from the base station (BS). Among physical channels during the initial random access (RA) or handover procedure, PRACH is a potential coverage bottleneck channel.

SUMMARY

This summary is a brief description of certain aspects of this disclosure. It is not intended to limit the scope of this disclosure.

According to one or more embodiments of this disclosure, A wireless communication method is disclosed. The method includes determining a Synchronization Signal Block (SSB) for a RACH process; and determining a RO set according to the determined SSB to transmit a PRACH for at least two times.

According to one or more embodiments of this disclosure, A wireless communication method is disclosed. The method includes receiving a PRACH, for at least two times from user equipment (UE), wherein the PRACH is transmitted on a RO set determined by the UE according to a Synchronization Signal Block (SSB) for a RACH process; and transmitting a responsive message in response to the PRACH.

Still another embodiment of this disclosure provides a wireless communication apparatus, including a memory storing one or more programs and a processor electrically coupled to the memory and configured to execute the one or more programs to perform any method or step or their combination in this disclosure.

Still another embodiment of this disclosure provides non-transitory computer-readable storage medium, storing one or more programs, the one or more program being configured to, when performed by a processor, cause to perform any method or step or their combination in this disclosure.

The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following drawings. The drawings are provided for purposes of illustration only and merely depict exemplary embodiments of the present disclosure to facilitate the understanding of the present disclosure. Therefore, the drawings should not be considered as limiting of the breadth, scope, or applicability of the present disclosure. It should be noted that for clarity and ease of illustration these drawings are not necessarily drawn to scale.

DETAILED DESCRIPTION

Figure 1:
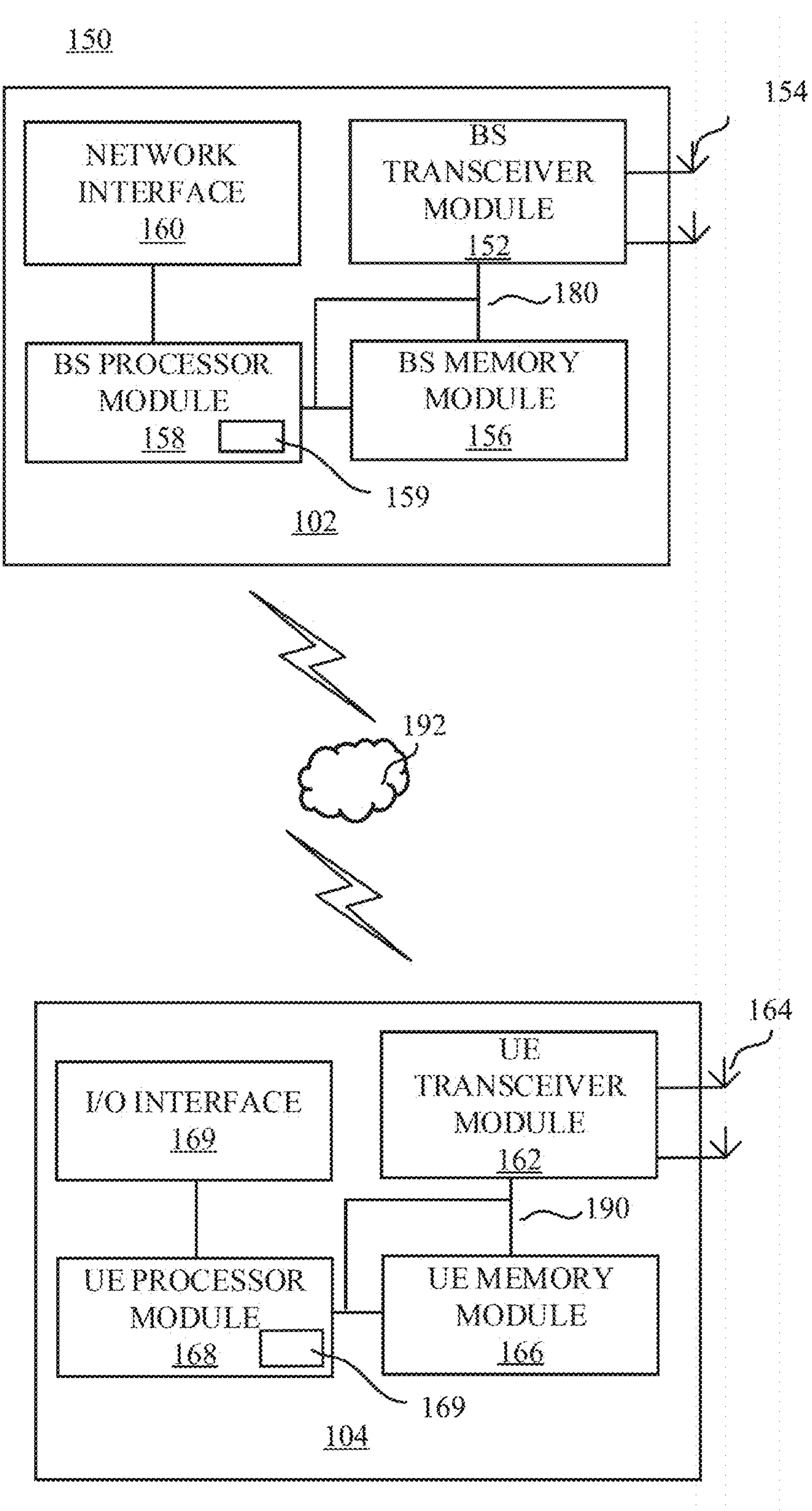
FIG. 1 shows an exemplary wireless communication system, which can implement the methods and/or steps in this disclosure.

FIG. 1 illustrates a block diagram of an exemplary wireless communication system 150, in accordance with some embodiments of this disclosure. The system 150 may perform the various methods/steps disclosed in this disclosure. The system 150 may include components and elements configured to support operating features that need not be described in detail herein.

The system 150 may include a base station (BS) 102 and a user equipment (UE) 104. The BS 102 includes a BS transceiver or transceiver module 152, a BS antenna system 154, a BS memory or memory module 156, a BS processor or processor module 158, and a network interface 160. The components of BS 102 may be electrically coupled and in communication with one another as necessary via a data communication bus 180. Likewise, the UE 104 includes a UE transceiver or transceiver module 162, a UE antenna system 164, a UE memory or memory module 166, a UE processor or processor module 168, and an I/O interface 169. The components of the UE 104 may be electrically coupled and in communication with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1. Those having ordinary skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from a transmitting antenna of the UE 104 (referred to singular form for convenience, but can include multiple antennae) to a receiving antenna of the BS 102 (referred to singular form for convenience, but can include multiple antennae) is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. There may be close synchronization timing with only a minimal guard time between changes in duplex direction. The UE transceiver 162 communicates through the UE antenna 164 with the BS 102 via the wireless communication channel 192. The BS transceiver 152 communicates through the BS antenna 154 of a BS (e.g., the first BS 102) with the other BS (e.g., the second BS 102-2) via a wireless communication channel 192. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long-Term Evolution (LTE) and 5G standards (e.g., NR), and the like. It is understood, however, that the invention is not necessarily limited in application to a particular standard and associated protocols. Rather, the UE transceiver 162 and the BS transceiver 152 may be configured to support alternative, or additional, wireless data communication protocols, including future standards or variations thereof.

The processor modules 158 and 168 may be implemented, or realized, with a general-purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module performed by processor modules 158 and 168, respectively, or in any practical combination thereof. The memory modules 156 and 166 may be realized as RAM memory, flash memory, EEPROM memory, registers, ROM memory, EPROM memory, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be performed by processor modules 158 and 168, respectively. The memory modules 156 and 166 may also each include non-volatile memory for storing instructions to be performed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)) or one or more core network for mobile communications. The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Figure 2:
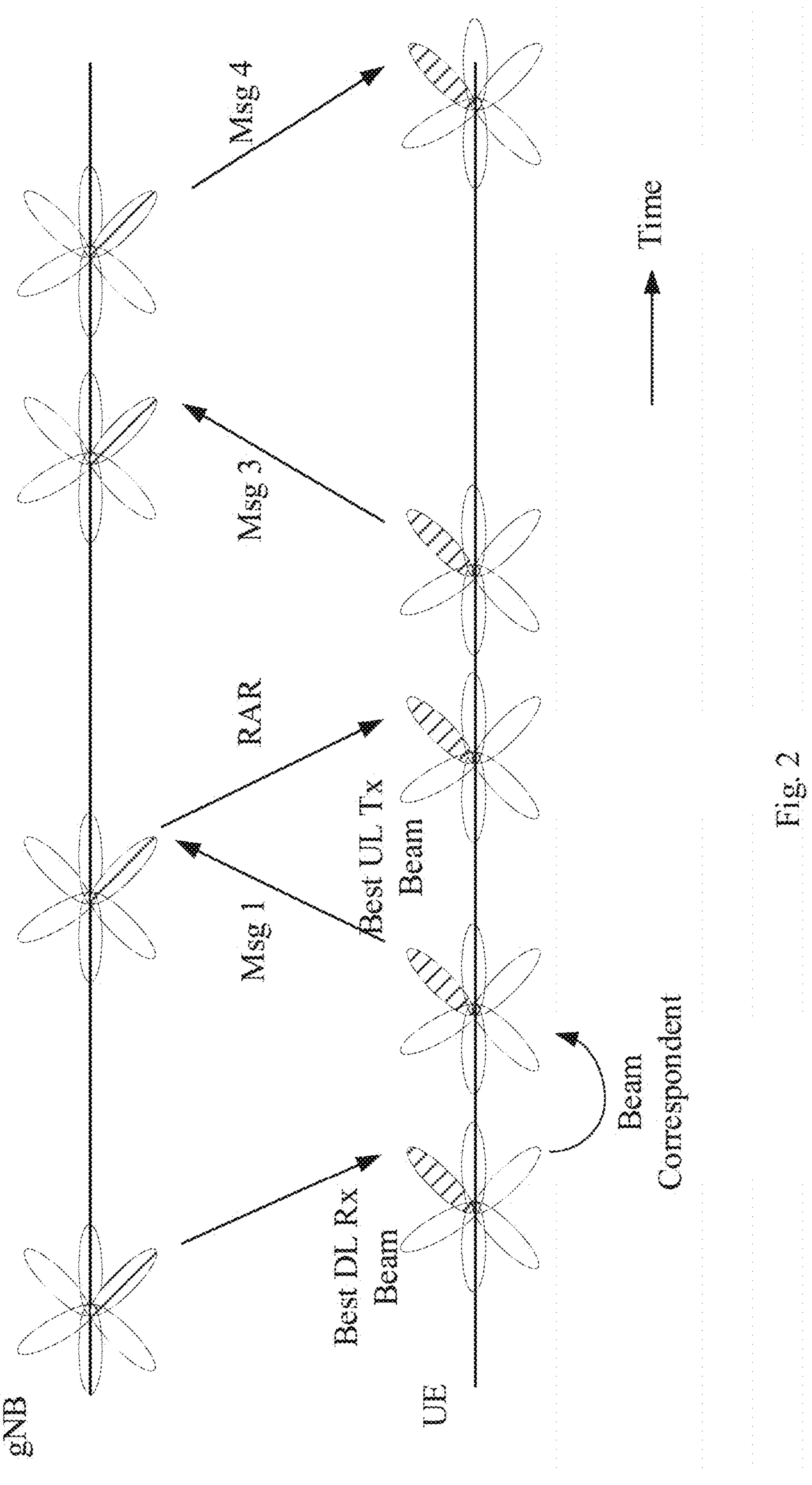
FIG. 2 illustrates a RACH process.

A random access (RACH) procedure establishes the connection between a BS and UE. There are, for example, two types of RACH procedures, Contention Based RACH Procedure (CBRA) and Contention Free RACH Procedure (CFRA). In contention based RACH as shown in FIG. 2, there are four messages communicated between the BS and the UE. The first message is Msg1, which includes a PRACH preamble. For example, the UE can find the good (or the best) beam(s) during the synchronization process, and the UE can use this beam and attempt the random access procedure by transmitting RACH preamble (Msg1) on the configured RACH resource (RO, RACH Occasion). The preamble may be referenced as the Random Access Preamble Id (RAPID). The second message is a RAR (Random Access Response) sent from the BS to the UE in response to the Msg1. The third message is a PUSCH sent from the UE to the BS. The four message Msg4 is a contention resolution message from the BS to the UE.

In contentions free RACH, the BS would first send a RACH preamble (PRACH) assignment by, for example, RRC configuration as preliminary signal. Then, the UE would send the first message including a RACH preamble (PRACH). The BS would in response send a RA response to the UE.

The transmission of PRACH has become a bottle neck of the field, and one of the resolutions is to implement PRACH repetition mechanism. Accordingly, same or compensatory PRACH can be transmitted for multiple times. The resource arrangement for the PRACH transmission is discussed in this disclosure as follows. The exemplary embodiments disclosed herein may be applied on, for example, CBRA or CFRA processes.

According to one or more embodiments of this disclosure, approaches to define PRACH occasion (RO) sets for multiple PRACH transmissions are discussed.

As explained above, PRACH may be transmitted for two or more times to enhance the transmission quality. There may be more than one ROs used to transmit the repetitions of the PRACH. A group of ROs used for multiple PRACH transmissions can be defined as an RO set. A repetition factor can be used to indicate the number of times a PRACH with repetitions would be transmitted. For example, a repetition factor of 4 means a PRACH would be transmitted four times (and exemplarily on four ROs). For example, for each PRACH transmission with a repetition factor N (i.e., PRACH repetitions with N times), a number of N ROs can be selected from an RO set. In some examples, an RO set is bound to the repetition factor. In this example, each RO set for a repetition factor N contains N or more than N valid ROs. Thereby, a UE can select the RO set, and the UE can further select at least a part of the ROs for the multiple PRACH transmissions.

In some examples, a number of valid ROs in one RO set may be equal to a corresponding repetition factor of a PRACH. In this case, the UE can select all the valid ROs for the multiple PRACH transmissions. In some other examples, the number of valid ROs in one RO set is greater than the repetition factor, and the UE can select a part of valid ROs according to a predefined rule for the multiple PRACH transmissions. For example, the pre-defined rule can require the UE to select the first few valid RO(s) or the last few valid RO(s) in the RO set.

There are different ways to define the relationship between valid ROs and RO sets. That is, the valid ROs contained in an RO set can be determined according to the examples or their combination discussed as follows.

Example 1

Figure 3:
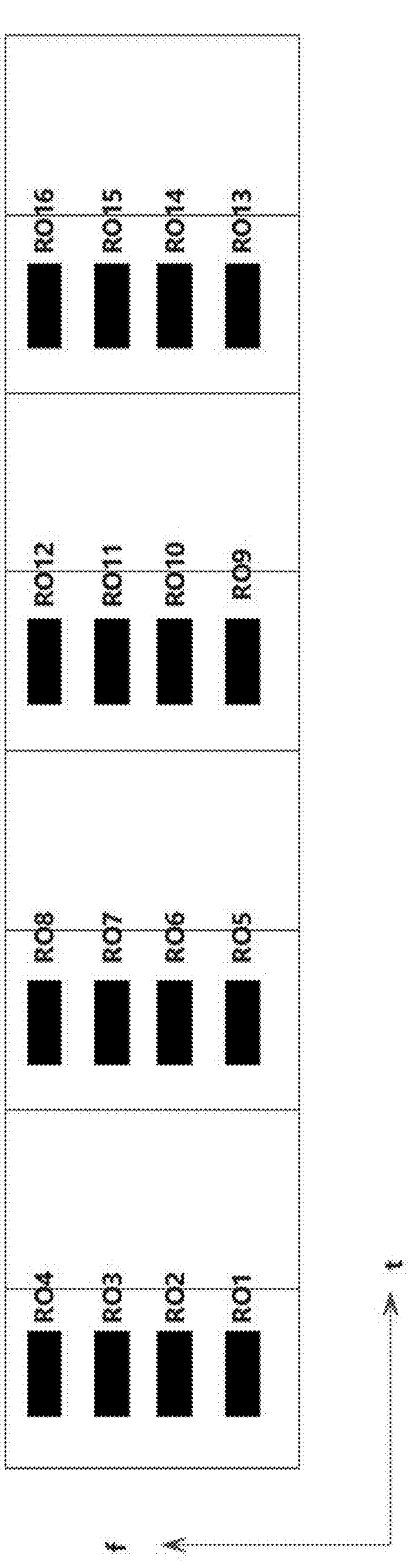
FIGS. 3-8 illustrate RO arrangements according to embodiments of this disclosure.

According to the time domain resource and frequency domain resource configuration for the PRACH transmission, the example ROs shown in FIG. 3 can be determined as valid ROs. Then, the example association between valid ROs and SSBs can be made according to some predefined rule. Those ROs would be assigned according to the time slot where a RO is located different SSBs in turn sequentially according to their indexes. In each specific time slot, the ROs would be assigned sequentially according to their respective frequency location. For example, the assignment can be first done in an increasing order of the frequency resource indexes for frequency-division multiplexed (FDMed) ROs, so the ROs are sequential associated with the SSBs. Second, the ROs are assigned in an increasing order of time resource indexes for time-division multiplexed (TDMed) ROs within a PRACH slot. Third, the ROs are assigned in an increasing order of indexes for PRACH slots. The actually SSBs used for transmission can be configured by an RRC signaling, e.g., ssb-PositionsInBurst. For example, there are four candidate SSBs, i.e., SSB0~SSB3, and the base station can select at least a part of them for transmitting, which can be called as actually transmitted SSBs. In this example, SSB1, SSB2, and SSB3 are actually transmitted by the base station.

For example in FIG. 3, RO1-RO4 are located in the same time slot but different frequency domain. In FIG. 3 and similar figures as indicated, the horizontal axis represents the time domain, and the vertical axis represents the frequency domain. The different blocks indicate the PRACH time slots. As shown in FIG. 3. RO1-RO4 would be associated with SSB1-SSB3 in turn according to their frequency location domain sequentially. Therefore, RO1 is associated with SSB1; RO2 is associated with SSB2; RO3 is associated to SSB3; ending the first cycle, RO4 is associated to SSB1 again in a new cycle. Then, the associating process can be conducted for the ROs in the subsequent time slot where RO5-RO8 are located. Repeating the same logic, the association between the valid ROs and actually transmitted SSBs can be listed below in Table 1. The valid ROs associated with one SSB can be called as a valid ROs list. For example, the valid ROs list of SSB1 contains RO1, RO4, RO7, RO10, RO13, RO16.

TABLE 1

| Actually Transmitted SSB | Associated Valid ROs List |
|---|---|
| SSB1 | RO1, RO4, RO7, RO10, RO13, RO16 |
| SSB2 | RO2, RO5, RO8, RO11, RO14 |
| SSB3 | RO3, RO6, RO9, RO12, RO15 |

To form the RO set for PRACH transmission with repetitions, the RO set can be obtained by selecting N valid ROs from the associated valid ROs list if the valid ROs meet one or more of the following conditions to form an RO set, where N is the repetition factor for this RO set. The UE and/or the BS may perform all or some steps disclosed herein to form the RO sets. Referencing to Table 1, the valid ROs selection for an RO set starts from RO with a lower index, and a valid RO can be selected for a same RO set if one or more of the following conditions is met:

Condition 1: Valid ROs are associated with a same SSB;

Condition 2: The valid ROs are in different time locations; and/or

Condition 3: The valid ROs have same frequency domain location.

Once a RO is selected for a specific RO set, the selected RO can be excluded from the to-be-selected list for the rest of the RO set. Therefore, the selected RO would not be selected from another RO set.

The foregoing selection steps can be repeatedly performed, so as to select one or more subsequent RO sets until remaining valid RO(s) in the associated valid RO list cannot form a new candidate RO set for PRACH transmission. With that said, a RO set used to the transmit a PRACH would meet one or more of the conditions 1-3 above.

As an example, assuming a repetition factor or number of valid ROs in the RO set is 2. For SSB1, the associated valid ROs list contains {RO1, RO4, RO7, RO10, RO13, RO16} as shown in Table 1. RO1 and RO13 can be selected firstly, as they meet all of the conditions above, to form an RO set. RO1 and RO 13 would be excluded from the candidate list to form the rest of the RO sets. Then, RO4 and RO16 can be selected to form another RO set by repeatedly performing the above method. The remaining valid ROs in the list are RO7 and RO10 for SSB1. They cannot form an RO set as they don't meet the conditions (as they do not have the same frequency domain).

In another example, if the number of remaining valid ROs in the list after performing the above procedure is still greater than or equal to the repetition factor, the first N remaining valid ROs can form another RO set, until the number of remaining valid ROs in the list is less than the repetition factor.

In some example, the conditions used to select the qualified ROs for an RO set may only include condition 1 and condition 2. Then, RO1 and RO7 can be selected to form an RO set. RO4 and RO10 can be then selected to form another RO set. Finally, the remaining valid ROs cannot form an RO set as they don't meet the conditions.

Example 2

Figure 4:
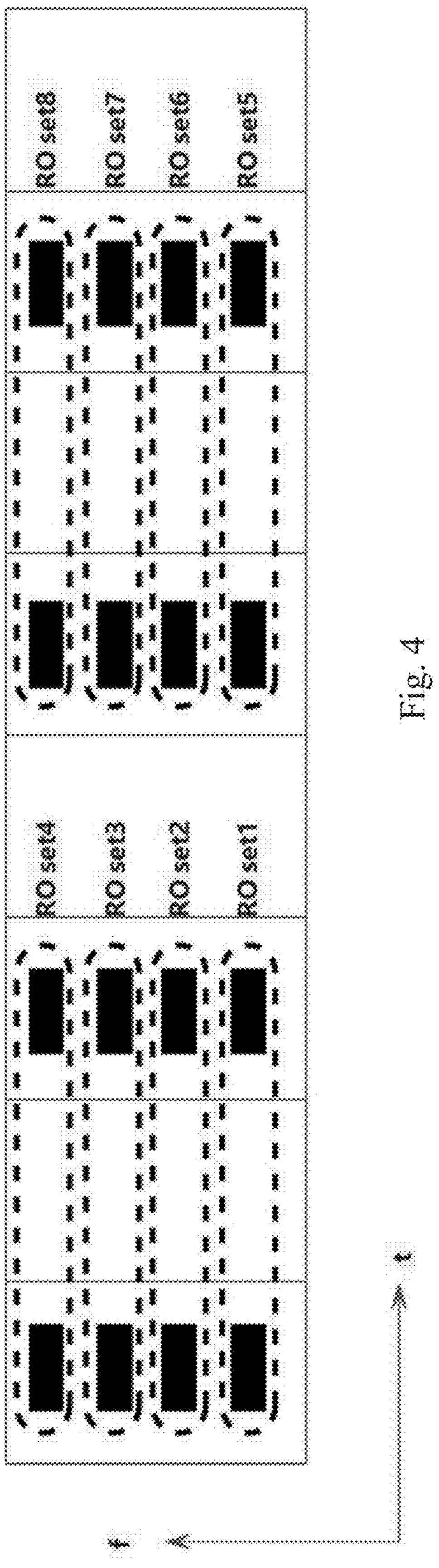

Alternatively or additionally, the ROs as shown in FIG. 4 can be determined as valid ROs. These valid ROs as shown in FIG. 4 can be divided into different RO sets firstly. For example, assuming a repetition factor or number of valid ROs in the RO set is 2, and the number of ROs in an RO set is determined based on the repetition factor. Then, two consecutive TDMed valid ROs are defined as one RO set. For example, two ROs at the same frequency domain and located at two closest time slots can be associated together to form an RO set. It is noted that there may be a time slot gap between two time slots of the associated ROs. Then, the RO sets can be first sorted or ordered in an increasing order of according to the respective frequency locations to be given an index for FDMed (Frequency Domain Multiplexed) RO sets. Second, the RO sets can be sorted or ordered in an increasing order of time resource indexes for TDMed (Time Domain Multiplexed) RO sets. That is, the RO sets at the overlapping time domain (such as RO set1~RO set4 in FIG. 4) would be indexed according to their frequency locations sequentially. Then, the RO sets at the subsequent time location (such as RO set5~RO set8) can be indexed sequentially in the same manner, starting from the index following the last index of the RO set in the preceding time slot.

Figure 5:
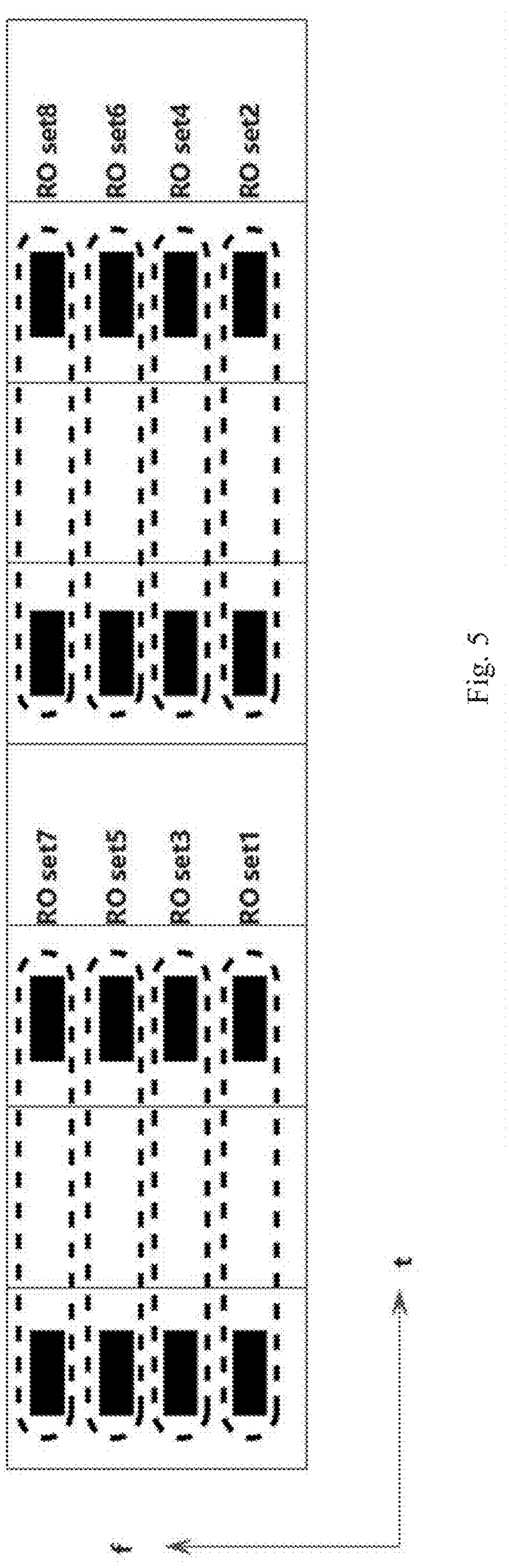

Alternatively or additional as shown in FIG. 5, another indexing approach can be implemented. Here, the RO sets can be first ordered in an increasing order of time resource indexes for TDMed RO sets. Second, the RO sets can be ordered in an increasing order of frequency resource indexes for FDMed RO sets. For example as shown in FIG. 5, the RO sets in the same frequency domain (such as RO set1 and RO set2) can be indexed first according to their time domain locations. Then, the RO sets at the next frequency location (RO set 3 and RO set 4) is indexed sequentially according to the time domain location. Repeating the same approach, the rest of the RO sets (RO set5~RO set8) can be indexed.

After the valid ROs are grouped and indexed, the indexed RO sets can be associated with SSBs in turn according to their indexes (RO set 1 to RO set 8). For example as shown in Table 2 below, the RO set is associated with SSB0; then RO set2 is associated with SSB1; RO set3 is associated with SSB3; RO set4 is associated with SSB0 again, and so on. Here it is assumed that the actually transmitted SSBs are SSB0, SSB1, and SSB3.

TABLE 2

| Actually Transmitted SSB | Associated RO Sets List |
|---|---|
| SSB0 | RO set1, RO set4, RO set7 |
| SSB1 | RO set2, RO set5, RO set8 |
| SSB3 | RO set3, RO set6 |

Example 3

According to one or more embodiments, the RO set can be obtained by adding one or more extra ROs and group the extra ROs with the existing ROs to form a RO sets. Additionally, the RO sets can be associated with an SSB which the exiting RO in the RO set is associated to.

Figure 6:
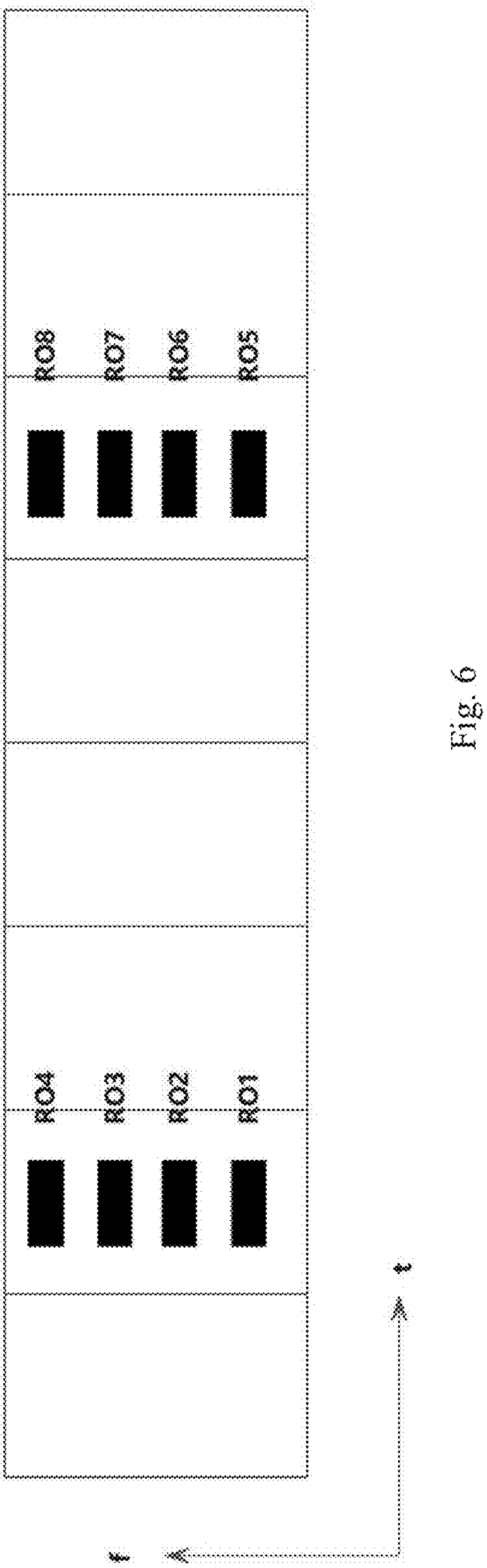

For example, RO1 to RO8 as shown in FIG. 6 can be the existing ROs (such as regular RO used for PRACH transmission without repetitions). These valid ROs may have their associated SSB. For example, Table 3 shows an exemplary association between the SSB and ROs (RO1~RO8) used to transmit the PRACH. For example, RO1, RO4, and RO7 are associated with SSB0.

TABLE 3

| Actually Transmitted SSB | Associated ROs List |
|---|---|
| SSB0 | RO1, RO4, RO7 |
| SSB1 | RO2, RO5, RO8 |
| SSB3 | RO3, RO6 |

Figure 7:
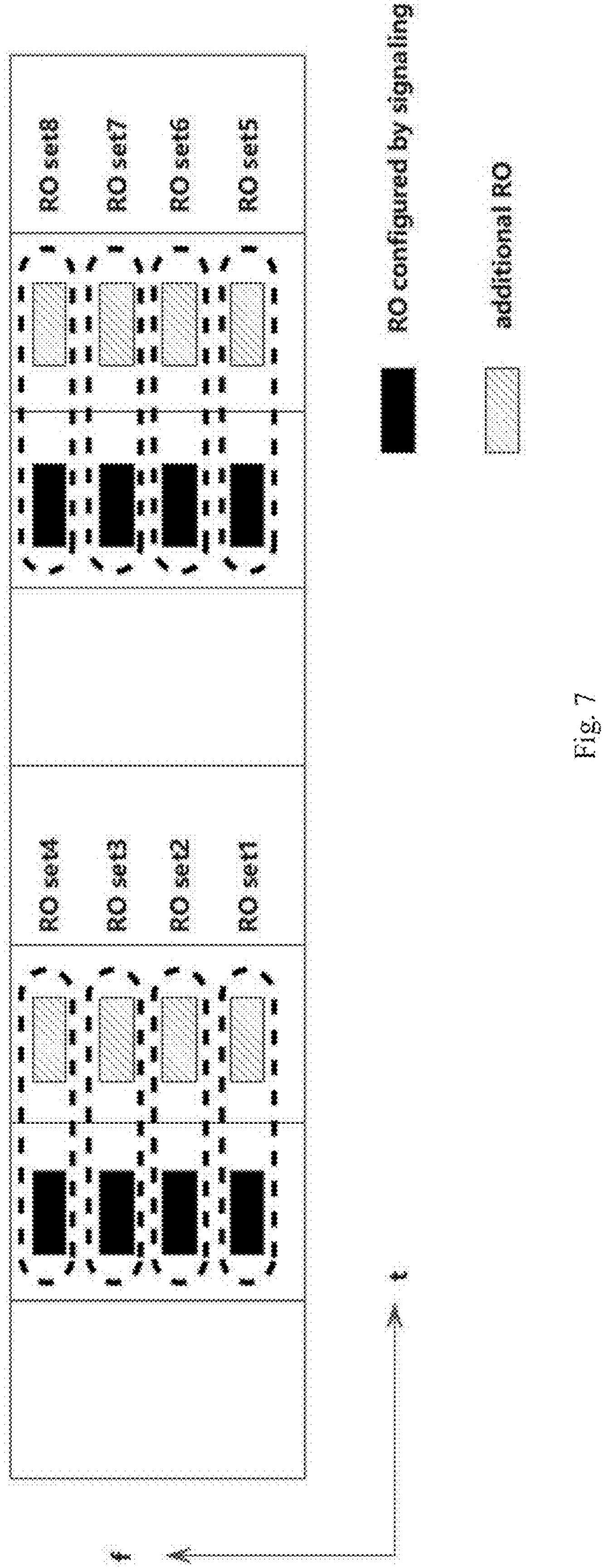

To obtain the RO sets for PRACH transmission with repetitions, a certain number of extra ROs can be introduced. As shown in FIG. 7, each exiting RO is added with an extra RO (filled with slash patterns) at the time slot next to the existing RO. The added extra ROs may have the same frequency location but different time slot with the existing RO associated with the respective extra RO. In this case, assuming a repetition factor or number of valid ROs in the RO set is 2, for each valid RO configured by signaling, one extra RO can be introduced for forming the RO set. As another example, if the repetition factor or number of valid ROs in one RO set is 4, there can be three extra introduced ROs for each configured valid RO; then, the RO set will be formed by three extra ROs and one configured valid RO. Therefore, a number of the introduced RO is determined according to the repetition factor and/or a number of the ROs in a RO set.

Additionally or alternatively, the time-frequency resources of the extra ROs may be obtained based on the time-frequency resources of the configured existing RO. For example, the time-frequency resources of the added ROs can be determined by shifting the time-frequency resources of the existing ROs in the time domain or the frequency domain. As shown in FIG. 7, the time-frequency resource of the extra RO is obtained by shifting the time-frequency resource of the configured RO for a time unit. The time unit may be one or more slot, subframe, half-frame, frame, or millisecond.

Figure 8:
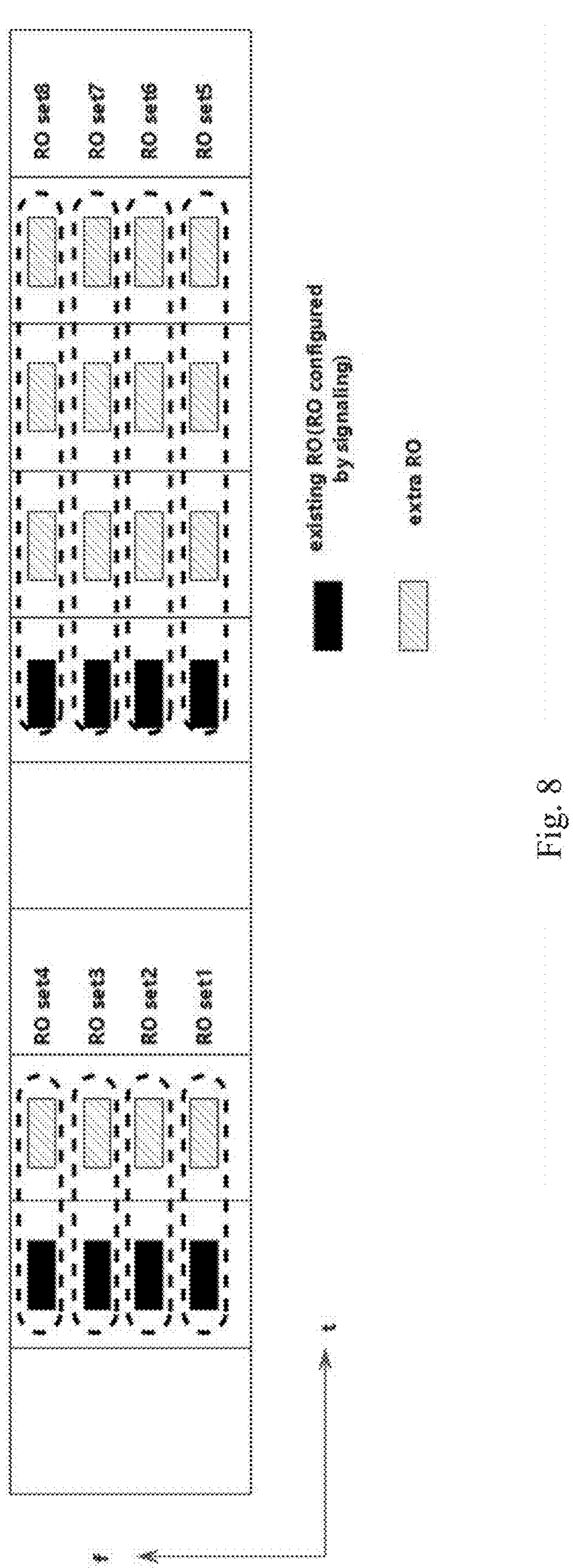

Additionally or alternatively, different existing ROs can be combined with different number of extra ROs to form RO set. As shown in FIG. 8, for existing RO1 to RO4, one extra RO is introduced for each of these existing ROs. Then, RO set 1 to RO set 4 are formed, and each RO set includes two ROs. Therefore, these ROs may correspond to a case in which the repetition factor is equal to 2. For existing RO5 to RO8, three extra ROs are introduced for each of these existing ROs. Then, RO set 5 to RO set 8 are formed by four ROs. Therefore, these ROs may correspond to a case in which the repetition factor is equal to 4.

Different ROs can be obtained via different RRC configurations. Alternatively, all of the ROs can be obtained via a single RRC configuration, and an additional information or rule can be used for distinguishing different existing ROs associated with different quantities of extra ROs. For example, the rule can be defined as follows: ROs in different time locations can be associated different repetition factors in a cyclic mode. In FIG. 8, two different repetition factors, e.g., 2 and 4, are supported in this cell. Then, for ROs in the first time domain location, i.e., RO 1~RO 4, will be associated with a repetition factor of 2. For ROs in the first time domain location, i.e., RO 5~RO 8, will be associated with a repetition factor of 4. Then, for ROs in the third time domain location (next to the time location of RO set5-RO set8) will be associated with repetition factor 2 again.

The association between RO sets and the actually transmitted SSBs can follow the association of the pre-existing RO within respective RO sets as shown in Table 4. Therefore, the extra RO has the same association relationship as the pre-existing RO in a same RO set. For example, RO set1 is associated with SSB0 according to the pre-existing RO's association to SSB0.

TABLE 4

| Actually Transmitted SSB | Associated RO Sets List |
|---|---|
| SSB0 | RO set1, RO set4, RO set7 |
| SSB1 | RO set2, RO set5, RO set8 |
| SSB3 | RO set3, RO set6 |

To determine which RO set can be used to transmit the PRACH with transmission, some RO set with one or more conflicting ROs may be excluded from the candidate. Alternatively or additionally, a conflicting RO can be excluded individually from being a candidate for PRACH transmission. The exemplary approaches are described as follows.

In some examples, if at least one RO in a RO set conflicts with another transmission, no RO in the RO set can be used for PRACH transmission. For example, the other transmissions that may conflict with the PRACH transmission can be at least one of SSB, Control resource set configured for Type0-PDCCH CSS (Common Search Space) set, PDCCH (Physical Downlink Control Channel), PDSCH (Physical Downlink Shared Channel), or CSI-RS (Channel State Information Reference Signal) reception, DL PRS (Downlink Positioning Reference Signal) reception.

Alternatively or additionally in some examples, the above exclusion only applies to an RO set corresponding to a PRACH repetition factor equal to or greater than a threshold, such as 2. Therefore, for an RO set corresponding to a repetition factor equal to or greater than a threshold, e.g., 2, if at least one RO in the RO set conflicts with another transmission, no RO in the RO set can be used for PRACH transmission. Potential conflicting transmissions have been enumerated above as examples. The threshold can be predefined between UE or BS or be configured via an RRC (Radio Resource Control) signaling. For a repetition factor equal to or greater than a predefined threshold, one PRACH attempt would occupy too many resources. Therefore, a priority of a PRACH transmission with a relatively large quantity of repetitions may be appropriately reduced.

Alternatively or additionally in some examples, the above exclusion only applies to an RO set corresponding to PRACH repetition factor equal to or less than a threshold, such as 2. Therefore, for an RO set corresponding to a repetition factor which equals to or less than a threshold, e.g., 2, if at least one RO in the RO set conflicts with another transmission, no RO in the RO set can be used for PRACH transmission. Potential conflicting transmissions have been enumerated above as examples. The threshold can be predefined in between UE or BS or be configured via an RRC signaling. When the repetition factor is equal to or less than a certain threshold, after one of the ROs is conflicted, the remaining resources in the RO set may be insufficient to meet the performance requirements of PRACH transmission. Therefore, the entire RO set can be abandoned.

Alternatively or additionally in some examples, a conflicting RO can be individually excluded, and the above exclusion only applies when the conflicting RO in the RO set is not the first RO in its RO set. For example, if a conflicting RO is not the first RO in an RO set, and if the conflicting RO conflicts with another transmission, this conflicting RO cannot be used for PRACH transmission. For the first RO in an RO set, if it conflicts with another transmission, the first RO can still be used for PRACH transmission as the exclusion only applies to the rest of the ROs in a RO set (if there is a conflicts). That is, the other transmission(s) conflicting with the first RO would be canceled for transmitting or receiving operations. Potential conflicting transmissions have been enumerated above as examples. In these examples, the first RO may be used by legacy UEs for single PRACH transmission, so the first RO in a RO set can be a higher priority than the other ones.

Here the conflict between an RO and another transmission includes, for example, an overlap of at least one symbol or at least one resource element (RE). Alternatively or additional, the conflict may also include the time a domain gap between resources for the RO and the conflicting transmission less than a predefined threshold. With the method described above, the conflict between RO and another transmission can be effectively managed, so as to improve the overall system efficiency and ensure more available resources for high-priority uplink services.

According to one or more embodiments, if a resource of at least one RO in an RO set is indicated as a canceled resource by UL (uplink) cancelation signaling, or indicated as a DL (downlink) resource or as a flexible resource by an SFI (Slot Format Indicator), no RO in the RO set can be used for PRACH transmission. Thereby, the PRACH transmission on this RO set should be canceled. The UL cancelation signaling can be a DCI (Downlink Control Information) format, e.g., DCI format 2_4, for indicating UL cancelation resource.

Alternatively or additionally in some examples, the above exclusion only applies to an RO set corresponding to a repetition factor equal to or greater than a predefined threshold. For an RO set corresponding to a repetition factor equal to or larger than a threshold, e.g., 2, if the resource of at least one RO in the RO set is indicated as a canceled resource by a UL cancelation signaling, or indicated as a DL resource or as a flexible resource by SFI, no RO in the RO set can be used for PRACH transmission. Thereby, the PRACH transmission on this RO set may be canceled. The threshold can be predefined among the system provider or configured via an RRC signaling. For repetition factor equal to or greater than a predefined threshold, one PRACH attempt would occupy too many resources. Therefore, a priority of a PRACH transmission with a relatively large quantity of repetitions may be appropriately reduced.

Alternatively or additionally in some examples, the above exclusion only applies to an RO set corresponding to a repetition factor equal to or less than a predefined threshold. For an RO set corresponding to a repetition factor equal to or less than a threshold, e.g., 2, if the resource of at least one RO in the RO set is indicated as a canceled resource, by a UL cancelation signaling, or indicated as a DL resource or flexible resource by SFI, no RO in the RO set can be used for PRACH transmission. Thus, the PRACH transmission on this RO set may be canceled. The threshold can be predefined in among the service providers or configured via an RRC signaling. When the repetition factor is equal to or less than a certain threshold, after one of the ROs is conflicted, the remaining resources in the RO set may be insufficient to meet the performance requirements of PRACH transmission. Therefore, the entire RO set can be abandoned.

Alternatively or additionally, if a RO is not the first RO in an RO set, and if the resource of this RO is indicated as canceled resource by a UL cancelation signaling or indicated as a DL resource or a flexible resource by SFI, this RO cannot be used for PRACH transmission. In other words, the PRACH transmission on this RO may be canceled. In these examples, the first RO may be used by legacy UEs for single PRACH transmission, so the first RO in a RO set can be a higher priority than the other ones.

With the methods described above, PRACH transmission on some ROs can be effectively canceled, so as to improve the overall system efficiency and ensure more available resources for high-priority uplink services.

In some cases, the preamble used for the RACH process may be distinguished based on the RRC status of the UE. The following discusses about distinguishing random access UEs according to different RRC statuses.

For Contention Based Random Access (CBRA), a UE in different RRC statuses (including, RRC_IDLE, RRC_INACTIVE, RRC_CONNECTED) can initiate the RACH process. When a RO set is used by a UE for PRACH transmission with repetitions, the UE in an RRC_CONNECTED state can identify a conflict between the ROs in the RO set and other transmissions or indicate PRACH on some ROs is canceled by UL cancelation signaling. This approach may avoid sending PRACHs on some conflicting ROs. However, the UEs in non-RRC_CONNECTED state cannot identify these conflicts. Therefore, RO resources used by UEs in different RRC connection states may be different. However, in the CBRA procedure, the traditional BS cannot identify whether the UE that initiates the procedure is in an RRC_CONNECTED state or not. Consequently, the BS cannot effectively combine the multiple PRACH transmissions without the information.

Figure 9:
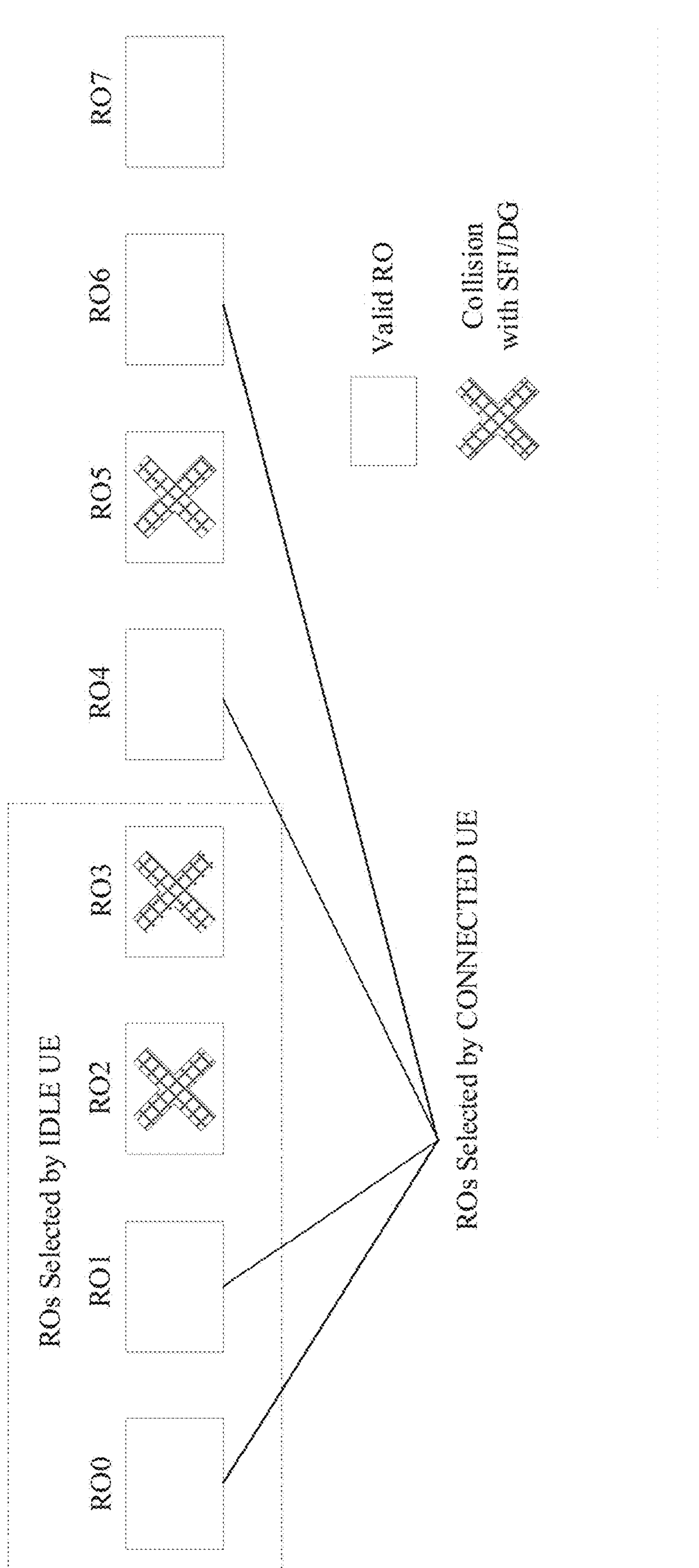
FIG. 9 shows RO selection by UEs for PRACH transmission.

As shown in FIG. 9 as an example, there may be 8 valid ROs, i.e., RO0~RO7 in one RO set. For a UE in RRC_IDLE or RRC_INACTIVE states, the first four valid ROs will be used for multiple PRACH transmissions with repetition factor 4 as the UE has not obtained the RO conflicting information from the BS on these states. On the other hand, for a UE in a RRC_CONNECTED state, valid RO0, RO1, RO4 and RO6 would be selected by the UE PRACH transmission with repetitions because RO2, RO3 and RO5 cannot be used for transmitting the PRACH in view of the conflicts with other transmission or cancel by UL cancelation signaling.

According to one or more embodiments, the BS may avoid incorrectly combining the multiple PRACH transmissions by configuring different PRACH transmission sequence resources (e.g., PRACH preambles) for UEs in different RRC states. For example, there can be two or more preambles sets for CBRA; the first preamble set can be configured and used for UE in RRC_CONNECTED state, and the second preamble set can be configured and used for UE in RRC_IDLE/RRC_INACTIVE states. Thereby, when the BS receives the multiple PRACH transmissions in the RO set, for combining the first four ROs, the BS only needs to perform correlation detection of the four received ROs by using preamble sequences in the first preamble set. For combining reception of RO0, RO1, RO4 and RO6, the base station only needs to perform correlation detection by using preamble sequences in the second preamble set.

With the method described above, incorrect combination of the ROs by BSs can be avoided, and reliability of receiving multiple PRACH transmission by the base station can be improved.

According to one or more embodiments of this disclose, a wireless communication method is disclosed. The method includes: determining, for example by UE, a Synchronization Signal Block (SSB) for a RACH process; and determining, for example by the UE, a RO (PRACH occasion) set according to the determined SSB to transmit a PRACH for at least two times.

According to one or more embodiments of this disclose, a wireless communication method is disclosed. The method includes: receiving, for example by a BS, a PRACH, for at least two times from user equipment (UE), wherein the PRACH is transmitted on a RO set determined by the UE according to a Synchronization Signal Block (SSB) for a RACH process; and transmitting, for example by the BS, a responsive message in response to the PRACH.

According to one implementation of the embodiments of this disclosure, one or more wireless transmission methods further includes receiving, from the UE, a RACH preamble for the RACH process, wherein the RACH preamble accords with a Radio resource control (RRC) state of the user equipment. According to one implementation of the embodiments of this disclosure, one or more wireless transmission methods further includes processing the PRACH transmitted at least two times according to the RACH preamble.

According to one implementation of the embodiments of this disclosure, a number of ROs in the RO set is equal to a repetition factor of the PRACH.

According to one implementation of the embodiments of this disclosure, a number of ROs in the RO set is greater than a repetition factor of the PRACH and the method further comprises selecting to-be-used ROs from the RO set according to the repetition factor of the PRACH.

According to one implementation of the embodiments of this disclosure, ROs in the RO set meet at least one of the following characteristics that the ROs in the RO set are associated with the determined SSB, the ROs in the RO set are in different time locations, and the ROs in the RO set have same frequency domain location.

According to one implementation of the embodiments of this disclosure, the determined RO set is selected from a plurality of candidate ROs that are associated with a same SSB, are in different time locations, and are in the same frequency domain location repetitively to form at least one RO set.

According to one implementation of the embodiments of this disclosure, determining a RO set includes selecting from a plurality of candidate ROs that are associated with a same SSB, are in different time locations, and are in the same frequency domain location repetitively to form at least one RO set.

According to one implementation of the embodiments of this disclosure, the determined RO set is selected from at least one candidate RO set by a user equipment.

According to one implementation of the embodiments of this disclosure, determining a RO set includes selecting from at least one candidate RO set by a user equipment.

According to one implementation of the embodiments of this disclosure, the at least one candidate RO set is obtained by steps comprising grouping two or more candidate ROs that are in closest time slots and at a same frequency location as a candidate RO set.

According to one implementation of the embodiments of this disclosure, the wireless communication method further includes obtaining the at least one candidate RO set by steps including grouping two or more candidate ROs that are in closest time slots and at a same frequency location as a candidate RO set.

According to one implementation of the embodiments of this disclosure, the at least one candidate RO set is sorted sequentially in a frequency domain first manner.

According to one implementation of the embodiments of this disclosure, the wireless communication method further includes sorting the at least one candidate RO set sequentially in a frequency domain first manner.

According to one implementation of the embodiments of this disclosure, the at least one candidate RO set is sorted in a time domain first manner.

According to one implementation of the embodiments of this disclosure, the wireless communication method further includes sorting the at least one candidate RO set sequentially in a time domain first manner.

According to one implementation of the embodiments of this disclosure, the at least one candidate RO set is associated with one or more candidate SSBs according to sorted sequence of the at least one candidate RO set.

According to one implementation of the embodiments of this disclosure, the wireless communication method further includes associating the at least one candidate RO set with one or more candidate SSBs according to sorted sequence of the at least one candidate RO set.

According to one implementation of the embodiments of this disclosure, the wireless communication method further includes preparing the at least one candidate RO set by steps including: introducing one or more additional candidate ROs to associate with existing candidate ROs to form the at least one candidate RO sets; and associating the at least one candidate RO set with one or more candidate SSBs according to an association between at least one candidate SSB and one or more exiting ROs in the each of the at least one candidate RO sets respectively.

According to one implementation of the embodiments of this disclosure, the at least one candidate RO set can be obtained by steps including: introducing one or more additional candidate ROs to associate with existing candidate ROs to form the at least one candidate RO sets; and associating the at least one candidate RO set with one or more candidate SSBs according to an association between at least one candidate SSB and one or more exiting ROs in the each of the at least one candidate RO sets respectively. According to one implementation of the embodiments of this disclosure, one or more disclosed wireless transmission methods further include excluding a conflicting RO set from being a candidate RO set when at least one RO in the conflicting RO set conflicts with another transmission.

According to one implementation of the embodiments of this disclosure, a conflicting RO set is excluded from being a candidate RO set when at least one RO in the conflicting RO set conflicts with another transmission.

According to one implementation of the embodiments of this disclosure, one or more disclosed wireless transmission methods further include excluding a conflicting RO set from being a candidate RO set when at least one RO in a conflicting RO set conflicts with another transmission and when a repetition factor of the conflicting RO set is greater than a predetermined number.

According to one implementation of the embodiments of this disclosure, a conflicting RO set is excluding from being a candidate RO set when at least one RO in a conflicting RO set conflicts with another transmission and when a repetition factor of the conflicting RO set is greater than a predetermined number.

According to one implementation of the embodiments of this disclosure, one or more disclosed wireless transmission methods further include excluding a conflicting RO set from being candidate RO set when at least one RO in the conflicting RO set conflicts with another transmission and when a repetition factor of the conflicting RO set is equal to or less than a predetermined number.

According to one implementation of the embodiments of this disclosure, a conflicting RO set is excluded from being candidate RO set when at least one RO in a conflicting RO set conflicts with another transmission and when a repetition factor of the conflicting RO set is equal to or less than a predetermined number.

According to one implementation of the embodiments of this disclosure, one or more disclosed wireless transmission methods further include excluding a conflicting RO from being a candidate RO when the conflicting RO, except when it is the first RO in its RO set, conflicts with another transmission. According to one implementation of the embodiments of this disclosure, a conflicting RO is excluded from being a candidate RO when the conflicting RO, except when it is the first RO in its RO set, conflicts with another transmission.

According to one implementation of the embodiments of this disclosure, one or more disclosed wireless transmission methods further include excluding a RO set from being a candidate RO set when information indicates at least one of the RO in the candidate RO set is a canceled recourse, a downlink resource, or a flexible resource.

According to one implementation of the embodiments of this disclosure, a RO set is excluded from being a RO set when information indicates at least one of the RO in the candidate RO set is a canceled recourse, a downlink resource, or a flexible resource.

According to one implementation of the embodiments of this disclosure, one or more disclosed wireless transmission methods further include excluding a RO set from being a candidate RO set when a repetition factor of the conflicting RO set is greater than a predetermined number and when information indicates at least one of the RO in the candidate RO set is a canceled recourse, a downlink resource, or a flexible resource.

According to one implementation of the embodiments of this disclosure, a RO set is excluded from being a candidate RO set when a repetition factor of the conflicting RO set is greater than a predetermined number and when information indicates at least one of the RO in the candidate RO set is a canceled recourse, a downlink resource, or a flexible resource.

According to one implementation of the embodiments of this disclosure, one or more disclosed wireless transmission methods further include excluding a candidate RO set as a candidate RO set when a repetition factor of the conflicting RO set is equal to or less than a predetermined number and when information indicates at least one of the RO in the candidate RO set is a canceled recourse, a downlink resource, or a flexible resource.

According to one implementation of the embodiments of this disclosure a RO set is excluded from being as a candidate RO set when a repetition factor of the conflicting RO set is equal to or less than a predetermined number and when information indicates at least one of the RO in the candidate RO set is a canceled recourse, a downlink resource, or a flexible resource.

According to one implementation of the embodiments of this disclosure, one or more disclosed wireless transmission methods further include excluding a conflicting RO from being a candidate RO when information indicates at least one of the RO, except when it is the first RO in its RO sets, is a canceled recourse, a downlink resource, or a flexible resource.

According to one implementation of the embodiments of this disclosure, a conflicting RO is excluded from being a candidate RO when information indicates at least one of the RO, except when it is the first RO in its RO sets, is a canceled recourse, a downlink resource, or a flexible resource.

According to one implementation of the embodiments of this disclosure, one or more disclosed wireless transmission methods further include transmitting, from user equipment, a RACH preamble for the RACH process, wherein the RACH preamble accords with a Radio resource control (RRC) state of the user equipment.

According to one implementation of the embodiments of this disclose, the steps or method disclosed herein may be perform by one or more wireless communication devices, such as a base station or user equipment.

According to one or more embodiments of this disclosure, a wireless communication apparatus is disclosed. The apparatus includes: a first determining module configured to determine a Synchronization Signal Block (SSB) for a RACH process; and a second determining module configured to determine a RO set according to the determined SSB to transmit a PRACH for at least two times.

According to one or more embodiments of this disclosure, a wireless communication apparatus is disclosed. The apparatus includes: a receiving module configured to receive a PRACH, for at least two times from user equipment (UE), wherein the PRACH is transmitted on a RO set determined by the UE according to a Synchronization Signal Block (SSB) for a RACH process; and a transmitting module configured to transmit a responsive message in response to the PRACH.

According to one or more embodiments of this disclosure, the wireless communication apparatus further includes a receiving module configured to receiving, from the UE, a RACH preamble for the RACH process, wherein the RACH preamble accords with a Radio resource control (RRC) state of the user equipment. According to one or more embodiments of this disclosure, the wireless communication apparatus further includes a processing module configured to process the PRACH transmitted at least two times according to the RACH preamble.

According to one or more embodiments of this disclosure, the wireless communication apparatus further includes an excluding module configured to exclude a conflicting RO set from being a candidate RO set when at least one RO in the conflicting RO set conflicts with another transmission.

According to one or more embodiments of this disclosure, the wireless communication apparatus further includes an excluding module configured to exclude a conflicting RO set from being a candidate RO set when at least one RO in the conflicting RO set conflicts with another transmission and when a repetition factor of the conflicting RO set is greater than a predetermined number.

According to one or more embodiments of this disclosure, the wireless communication apparatus further includes an excluding module configured to exclude conflicting RO set from being candidate RO set when at least one RO in the conflicting RO set conflicts with another transmission and when a repetition factor of the conflicting RO set is equal to or less than a predetermined number.

According to one or more embodiments of this disclosure, the wireless communication apparatus further includes an excluding module configured to exclude a conflicting RO from being a candidate RO when the conflicting RO, except when it is the first RO in its RO set, conflicts with another transmission.

According to one or more embodiments of this disclosure, the wireless communication apparatus further includes an excluding module configured to exclude a RO set from being a candidate RO set when information indicates at least one of the RO in the candidate RO set is a canceled recourse, a downlink resource, or a flexible resource.

According to one or more embodiments of this disclosure, the wireless communication apparatus further includes an excluding module configured to exclude a RO set from being a candidate RO set when a repetition factor of the conflicting RO set is greater than a predetermined number and when information indicates at least one of the RO in the candidate RO set is a canceled recourse, a downlink resource, or a flexible resource.

According to one or more embodiments of this disclosure, the wireless communication apparatus further includes an excluding module configured to exclude a RO set from being a candidate RO set when a repetition factor of the conflicting RO set is equal to or less than a predetermined number and when information indicates at least one of the RO in the candidate RO set is a canceled recourse, a downlink resource, or a flexible resource.

According to one or more embodiments of this disclosure, the wireless communication apparatus further includes an excluding module configured to exclude a conflicting RO from being a candidate RO when information indicates at least one of the RO, except when it is the first RO in its RO sets, is a canceled recourse, a downlink resource, or a flexible resource.

According to one or more embodiments of this disclosure, the wireless communication apparatus further includes a transmitting module configured to transmit, from user equipment, a RACH preamble for the RACH process, wherein the RACH preamble accords with a Radio resource control (RRC) state of the user equipment.

Various exemplary embodiments of the present disclosure are described herein with reference to the accompanying figures to enable a person of ordinary skill in the art to make and use the present disclosure. The present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art would understand that the methods and techniques disclosed herein present various steps or acts in exemplary order(s), and the present disclosure is not limited to the specific order or hierarchy presented unless expressly stated otherwise.

This disclosure is intended to cover any conceivable variations, uses, combination, or adaptive changes of this disclosure following the general principles of this disclosure, and includes well-known knowledge and conventional technical means in the art and undisclosed in this application.

It is to be understood that this disclosure is not limited to the precise structures or operation described above and shown in the accompanying drawings, and various modifications and changes may be made without departing from the scope of this application. The scope of this application is subject only to the appended claims.

The methods, devices, processing, circuitry, and logic described above may be implemented in many different ways and in many different combinations of hardware and software. For example, all or parts of the implementations may be circuitry that includes an instruction processor or controller, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when performed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when performed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that includes instructions executable with the processor or other processors to implement one or more of the features of the logical components. When any one of the logical components includes the portion of the memory that includes instructions executable with the processor, the logical component may or may not include the processor. In some examples, each logical component may just be the portion of the memory or other physical memory that includes instructions executable with the processor or other processor to implement the features of the corresponding logical component without the logical component including any other hardware. Because each logical component includes at least some hardware even when the included hardware includes software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The invention claimed is:

1. A wireless communication method, performed by a user equipment (UE), comprising:

determining a Synchronization Signal Block (SSB) for a Random Access Channel (RACH) process; and determining a Physical Random Access Channel (PRACH) occasion (RO) set according to the determined SSB to transmit a same RACH preamble for at least two times, wherein ROs in the RO set are associated with the determined SSB, are in different time locations, and have a same frequency domain location, wherein the RO set is selected from at least one candidate RO set by the UE, and wherein each of the at least one candidate RO set comprises two or more candidate ROs that are consecutive in time and are in the same frequency domain location.

2. The method of claim 1, wherein a number of ROs in the RO set is equal to a repetition factor of the PRACH.

3. The method of claim 1, wherein the at least one candidate RO set is ordered sequentially in a frequency domain first and time domain second manner.

4. The method of claim 1, wherein one RO being in only one RO set.

5. The method of claim 1, wherein the two or more candidate ROs are consecutively associated with a same SSB index.

6. The method of claim 1, wherein a first valid PRACH occasion of a subsequent candidate RO set is after a configurable number of consecutive valid PRACH occasions in time from a first valid PRACH occasion of a previous candidate RO set, wherein each PRACH occasion in the configurable number is associated with a same SS/PBCH block index.

7. The method of claim 1, wherein each SS/PBCH block index is associated with same preamble indexes in all valid PRACH occasions within the RO set.

8. The method of claim 1, wherein a number of times the PRACH is transmitted is one of two, four, or eight.

9. A wireless communication method, comprising:

receiving a same Random Access Channel (RACH) preamble, for at least two times from user equipment (UE), wherein the same RACH preamble is transmitted on a Physical Random Access Channel (PRACH) occasion (RO) set determined by the UE according to a Synchronization Signal Block (SSB) for a RACH process; and transmitting a responsive message in response to the same RACH preamble, wherein ROs in the RO set are associated with the determined SSB, are in different time locations, and have a same frequency domain location, wherein the RO set is selected from at least one candidate RO set by the user equipment, and wherein each of the at least one candidate RO set comprises two or more candidate ROs that are consecutive in time and are in the same frequency domain location.

10. The method of claim 9, wherein a number of ROs in the RO set is equal to a repetition factor of the PRACH.

11. The method of claim 9, wherein the at least one candidate RO set is ordered sequentially in a frequency domain first and time domain second manner.

12. The method of claim 9, wherein one RO being in only one RO set.

13. A wireless communication apparatus, comprising a memory storing one or more programs and one or more processors electrically coupled to the memory and configured to execute the one or more programs to:

determine a Synchronization Signal Block (SSB) for a Random Access Channel (RACH) process; and determine a Physical Random Access Channel (PRACH) occasion (RO) set according to the determined SSB to transmit a same RACH preamble for at least two times, wherein ROs in the RO set are associated with the determined SSB, are in different time locations, and have a same frequency domain location, wherein the RO set is selected from at least one candidate RO set by the wireless communication apparatus, and wherein each of the at least one candidate RO set comprises two or more candidate ROs that are consecutive in time and are in the same frequency domain location.

14. The apparatus of claim 13, wherein a number of ROs in the RO set is equal to a repetition factor of the PRACH.

15. The apparatus of claim 13, wherein the at least one candidate RO set is ordered sequentially in a frequency domain first and time domain second manner.

16. The apparatus of claim 13, wherein one RO being in only one RO set.

17. A wireless communication apparatus, comprising a memory storing one or more programs and one or more processors electrically coupled to the memory and configured to execute the one or more programs to:

receive a same Random Access Channel (RACH) preamble, for at least two times from user equipment (UE), wherein the same RACH preamble is transmitted on a Physical Random Access Channel (PRACH) occasion (RO) set determined by the UE according to a Synchronization Signal Block (SSB) for a RACH process; and transmit a responsive message in response to the same RACH preamble, wherein ROs in the RO set are associated with the determined SSB, are in different time locations, and have a same frequency domain location, wherein the RO set is selected from at least one candidate RO set by the user equipment, and wherein each of the at least one candidate RO set comprises two or more candidate ROs that are consecutive in time and are in the same frequency domain location.

18. The apparatus of claim 17, wherein a number of ROs in the RO set is equal to a repetition factor of the PRACH.

19. The apparatus of claim 17, wherein the at least one candidate RO set is ordered sequentially in a frequency domain first and time domain second manner.

20. The apparatus of claim 17, wherein one RO being in only one RO set.

* * * * *